United States Patent
Machacek et al.

(10) Patent No.: US 9,187,926 B2
(45) Date of Patent: Nov. 17, 2015

(54) PARTITION ASSEMBLY

(75) Inventors: Robert William Machacek, Lombard, IL (US); Sergio Meza, Lyons, IL (US); Matthew Johnson, Chicago, IL (US); Mark Douglas Wynne, Bedford Park, IL (US)

(73) Assignee: L&P Property Management Company, South Gate, CA (US)

( * ) Notice: Subject to any disclaimer, the term of this patent is extended or adjusted under 35 U.S.C. 154(b) by 217 days.

(21) Appl. No.: 13/342,310

(22) Filed: Jan. 3, 2012

(65) Prior Publication Data

US 2013/0168625 A1    Jul. 4, 2013

(51) Int. Cl.
*E04H 17/16*    (2006.01)
*F16B 7/04*    (2006.01)

(52) U.S. Cl.
CPC ............. *E04H 17/163* (2013.01); *F16B 7/0473* (2013.01)

(58) Field of Classification Search
CPC ................................ E04H 17/16; F16B 7/0473
USPC ........ 256/24, 25, 30, 31, 65.01–65.08, 65.13, 256/73; 49/463, 465; 160/351; 403/263, 403/321, 322.1, 326, 328; 52/36.1, 64, 52/127.8, 764, 772
See application file for complete search history.

(56) References Cited

U.S. PATENT DOCUMENTS

| | | | |
|---|---|---|---|
| 723,289 A | 3/1903 | Lovekin | |
| 900,590 A * | 10/1908 | Raymond | 40/575 |
| 1,361,702 A | 12/1920 | Falls | |
| 1,671,328 A | 5/1928 | Sturm | |
| 1,883,171 A | 10/1932 | Voigt | |
| 2,261,796 A | 11/1941 | Courtney | |
| 2,357,552 A | 9/1944 | Schlage | |
| 2,970,677 A * | 2/1961 | Springs, Jr. et al. | 52/769 |
| 2,973,222 A * | 2/1961 | Ellzey et al. | 296/53 |
| 3,346,238 A * | 10/1967 | Dashio | 256/24 |

(Continued)

OTHER PUBLICATIONS

Non-Final Office Action dated Jan. 4, 2013 in U.S. Appl. No. 13/212,547, 25 pages.

(Continued)

*Primary Examiner* — Gregory Binda
*Assistant Examiner* — Nahid Amiri
(74) *Attorney, Agent, or Firm* — Shook, Hardy & Bacon L.L.P.

(57) ABSTRACT

A screening for separating a protected area has a plurality of vertical supports with removable panels between the supports. Upper attachment members on the supports have a vertical channel for slideably receiving a complementary attachment member on the panel. A hook on one attachment member engages a catch on the other to retain the attachment members together. The lower end of the panel is retained between parallel flanges on the vertical supports. A tool is provided to release the hook for removal of the panel from the vertical supports.

13 Claims, 16 Drawing Sheets

(56) References Cited

U.S. PATENT DOCUMENTS

| | | | |
|---|---|---|---|
| 3,479,851 A | 11/1969 | Davidson et al. | |
| 3,596,954 A | 8/1971 | Hull et al. | |
| 4,139,999 A | 2/1979 | Allenbaugh | |
| 4,356,667 A | 11/1982 | Malachowski | |
| 5,014,466 A | 5/1991 | Winner | |
| 5,054,255 A * | 10/1991 | Maninfior | 52/239 |
| 5,244,300 A * | 9/1993 | Perreira et al. | 403/381 |
| 5,364,076 A | 11/1994 | Nicholls et al. | |
| 5,372,354 A | 12/1994 | Cacicedo et al. | |
| 5,599,006 A * | 2/1997 | Gevaux et al. | 256/25 |
| 6,712,118 B2 * | 3/2004 | Nussdorf | 160/351 |
| 6,802,168 B1 * | 10/2004 | Minnick | 52/592.1 |
| 7,377,490 B1 * | 5/2008 | Khosravian | 256/24 |
| 7,448,820 B1 * | 11/2008 | Faber | 403/240 |
| 7,461,489 B2 * | 12/2008 | Herbertsson | 52/578 |
| 7,857,291 B2 | 12/2010 | Dombroski | |
| 2006/0273294 A1 | 12/2006 | Dombroski | |

OTHER PUBLICATIONS

Non-Final Office Action dated Feb. 26, 2013 in U.S. Appl. No. 12/916,520, 16 pages.

Non-Final Office Action dated May 14, 2013 in U.S. Appl. No. 12/916,517, 2 pages.

Notice of Allowance dated Aug. 23, 2013 in U.S. Appl. No. 13/212,547, 11 pages.

Final Office Action dated Nov. 19, 2013 in U.S. Appl. No. 12/916,520 10 pages.

Notice of Allowance dated Jul. 2, 2014 in U.S. Appl. No. 12/916,520, 5 pages.

* cited by examiner

PARTITION ASSEMBLY

The present invention relates to assembling and locking together partition elements for isolating protected areas, including lockable members that can be unlocked to permit repair or replacement of the partition elements.

BACKGROUND OF THE INVENTION

Industrial sites, such as factories and the like, may have a large portion of the floor area that contains equipment that presents a danger to unwary bystanders. The equipment may be in the form of machines that would endanger inexperienced or inadequately attired personnel, high voltage equipment, or toxic chemicals or compounds. The structure that encloses such restricted areas must be sufficiently strong to provide an adequate barrier to prevent unauthorized entry, and yet the enclosure must be reasonably attractive. Furthermore, such structures are subject to damage from vehicles and the like operating inside and outside the protected area, and therefore the panels of the enclosure must be replaceable. In many cases the enclosure surrounds machinery or equipment that requires little attention, and the replaceable panels permit entry into the protected area without requiring a more expensive door panel. Space limitations may also prohibit the installation of a door that swings open. It is therefore desirable that the panels be easily replaced. Once installed, however, the panels must be resistant to tampering from unauthorized personnel, particularly personnel outside the protected area.

To provide for easy replacement of the panels that make up a partition, it has become customary to provide a locking device for locking and unlocking a panel between parallel support members where operation of the lock requires a tool. Where the tool is a readily available such as an Allen wrench, an unauthorized personnel with access to such a tool can easily compromise the barrier and obtain unauthorized access to a restricted area. It is desirable therefore to provide an assembly device with a latch that will connect the parts together but can be easily unlatched to replace a panel. It is also desirable to provide a unique tool for disconnecting the parts for removing the panel.

SUMMARY OF THE INVENTION

Briefly, the invention is embodied in a screen for separating an inner protected area from a more accessible area that includes a plurality of vertical supports, and between each pair of vertical supports is fitted a removable partition panel. The panel has an inner surface directed towards the protected area and an outer surface directed towards the more accessible area, and further has opposing sides.

The vertical supports each have a plurality of attachments members thereon, and each panel has panel attachment members thereon adapted for removably attaching to complementary attachment members on the vertical supports.

In accordance with the present invention, one of the attachment members on the vertical supports has a vertical track thereon. The panel has a complementary attachment member thereon where the complementary attachment member includes a surface for receiving the track of the support attachment member. The panel attachment member is therefore vertically moveable along the track. A hook is provided on one of the panel attachment member and the support attachment member and a catch is provided on the other of the panel attachment member and the support attachment member such that the catch will receive the hook and retain the two attachment members in engagement to each other.

The invention further includes a release tool having a surface for releasing the catch from the hook and thereby disconnecting the panel attachment member from the support attachment member.

To insert a panel between vertical support members, the surface on the panel attachment member is engaged with the track of the vertical support and the panel moved downwardly until the hook engages the catch locking the parts together. To subsequently release the panel, the tool is used to release the hook from the catch, after which the panel can be moved upwardly until the surface of the panel no longer engages the track.

BRIEF DESCRIPTION OF THE DRAWINGS

A better understanding of the invention will be had after a reading of the following detailed description taken in conjunction with the drawings wherein.

DETAILED DESCRIPTION OF PREFERRED EMBODIMENT

Figure 1:
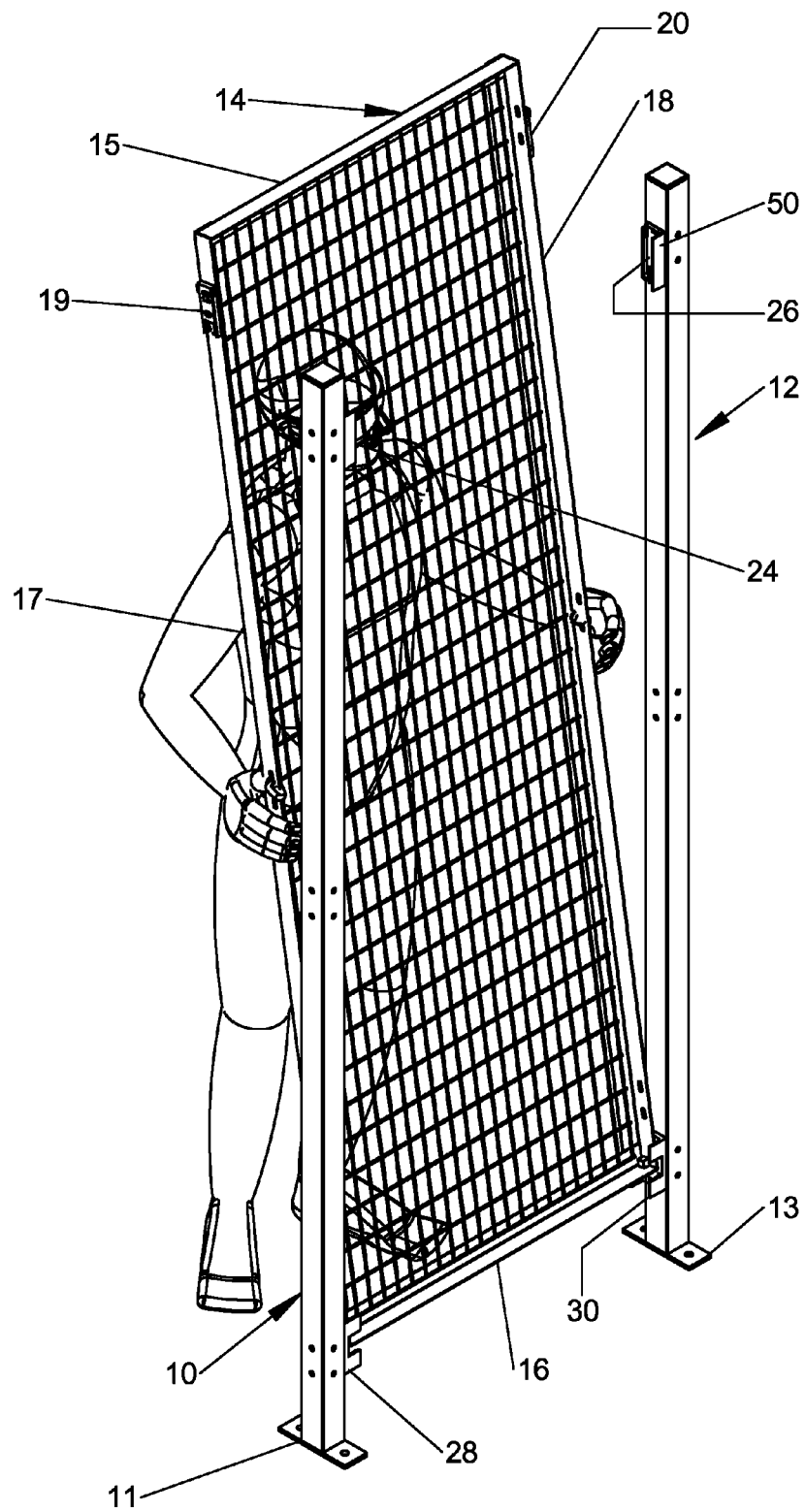
FIG. 1 is an isometric view taken from inside the protected area of a portion of an enclosure showing a panel of the enclosure being assembled between spaced apart support members.
Figure 2:
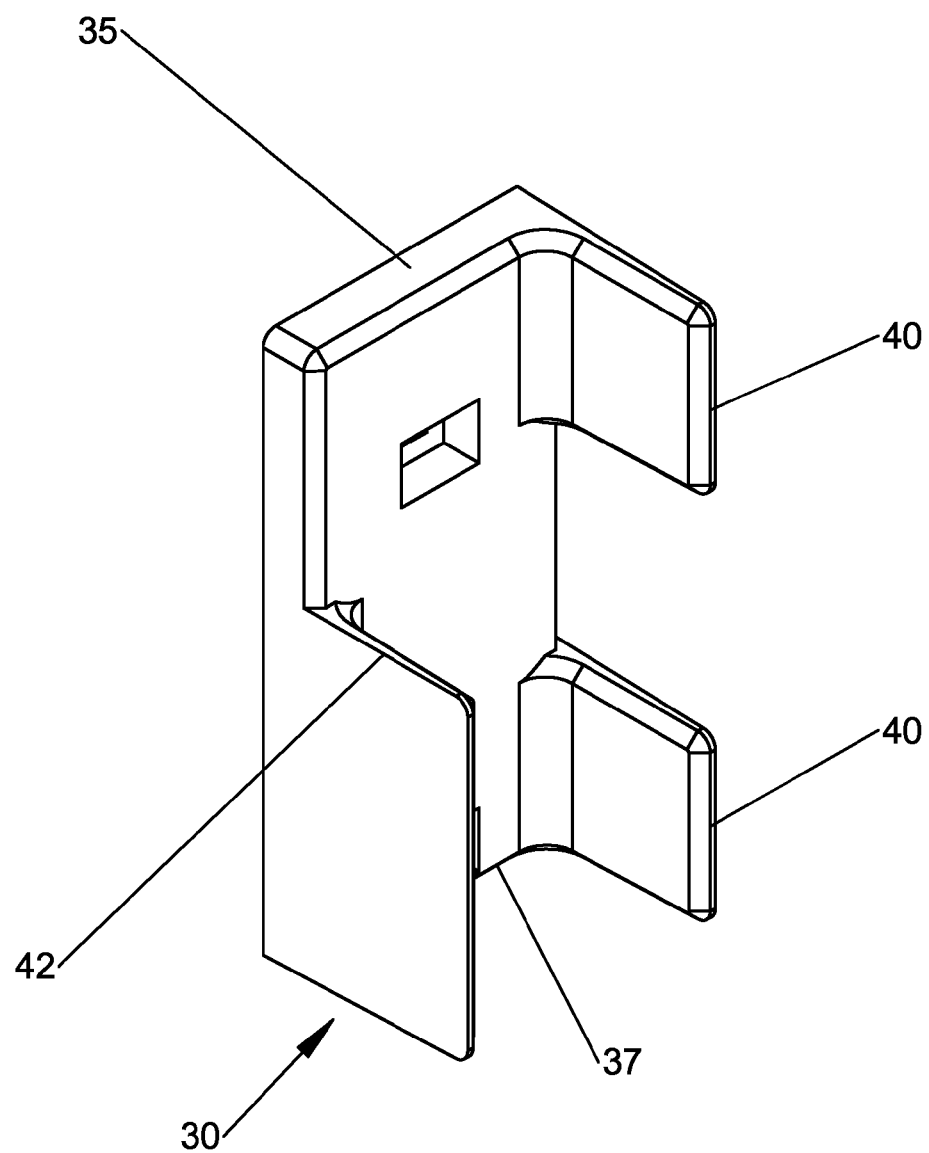
FIG. 2 is an isometric view of a lower attachment member on one of the vertical supports for receiving the lower end of one side of a panel.
Figure 3:
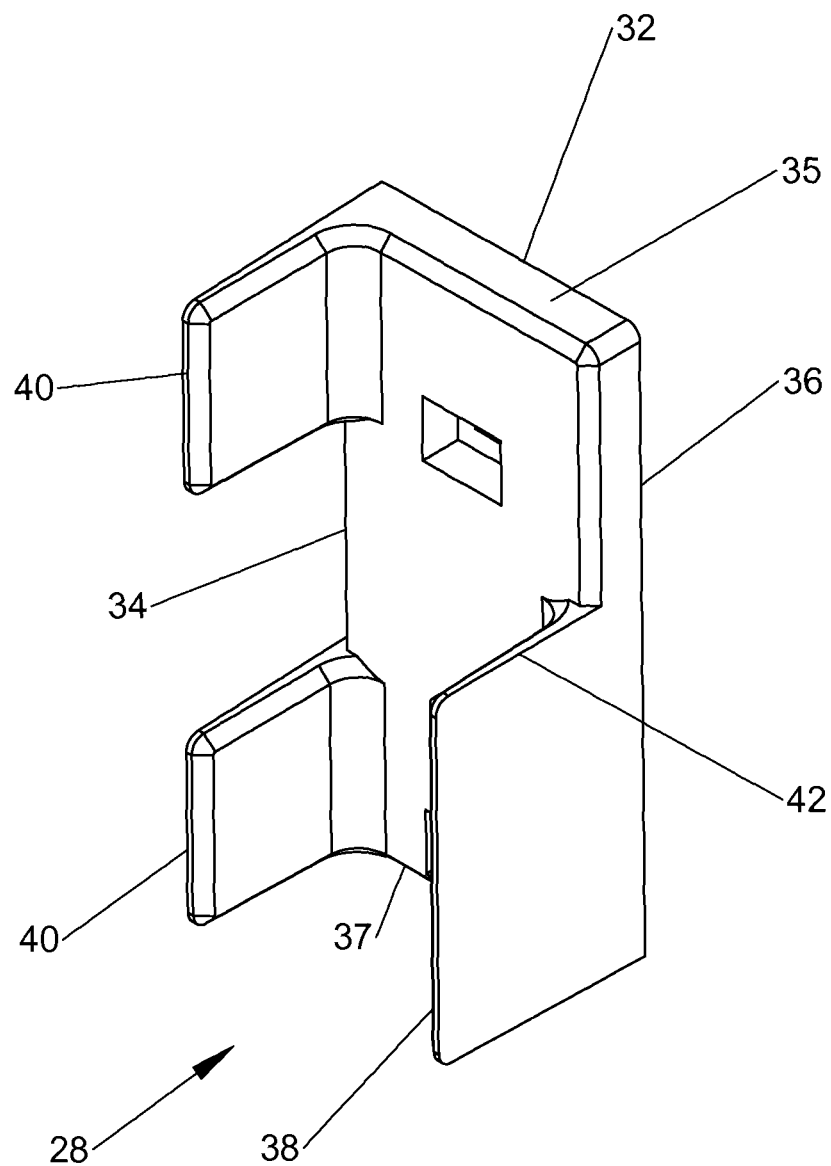
FIG. 3 is an isometric view of the lower attachment member on the adjacent vertical support for receiving the second side of the panel.

Referring to FIG. 1, a screening for isolating a protected area from a more accessible area includes a plurality of spaced apart vertical supports 10, 12 with the supports 10, 12 positioned to define the outer perimeter of the area to be enclosed. The supports 10, 12 have mounting plates 11, 13 at their lower ends for secure attachment to a floor using means well known in the art. Between each pair of adjacent supports 10, 12 is a panel 14 having an upper edge 15, a lower edge 16, and spaced apart parallel sides 17, 18. The panel 14 is moveably retained between the adjacent supports 10, 12 by a pair of panel attachment members 19, 20 on opposite sides 17, 18 of the panel 14 with each of the panel attachment members 19, 20 engaging complementary upper attachment members 24, 26 on each of the vertical supports 10, 12 respectively. The lower edge 16 of the panel 14 is retained between the supports 10, 12 by lower retainers 28, 30 on support members 10, 12 respectively.

As best shown in FIGS. 1 through 4, the lower retainers 28, 30 are positioned to retain opposite sides of the lower end of panel 14. Only lower retainer 28 is described in detail herein because member 30 is a mirror image of lower retainer 28 as will be seen by comparing FIG. 2 to FIG. 3.

Figure 4:
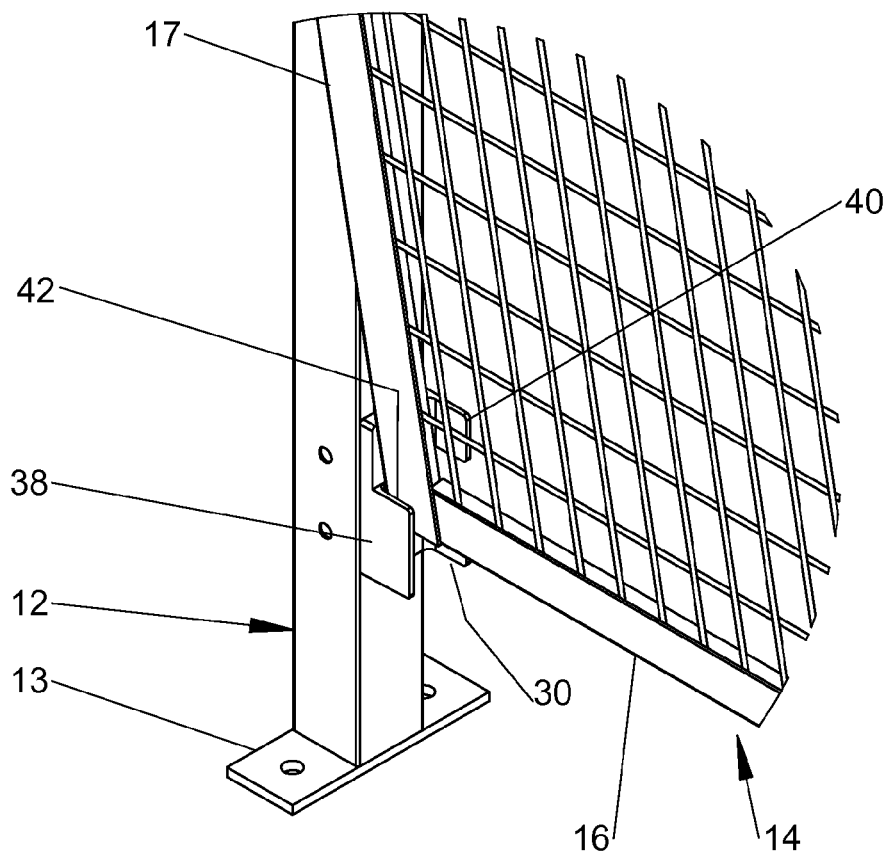
FIG. 4 is an isometric view of the attachment member shown in FIG. 2 assembled to a vertical support with the lower end of a panel being inserted into the attachment member.
Figure 5:
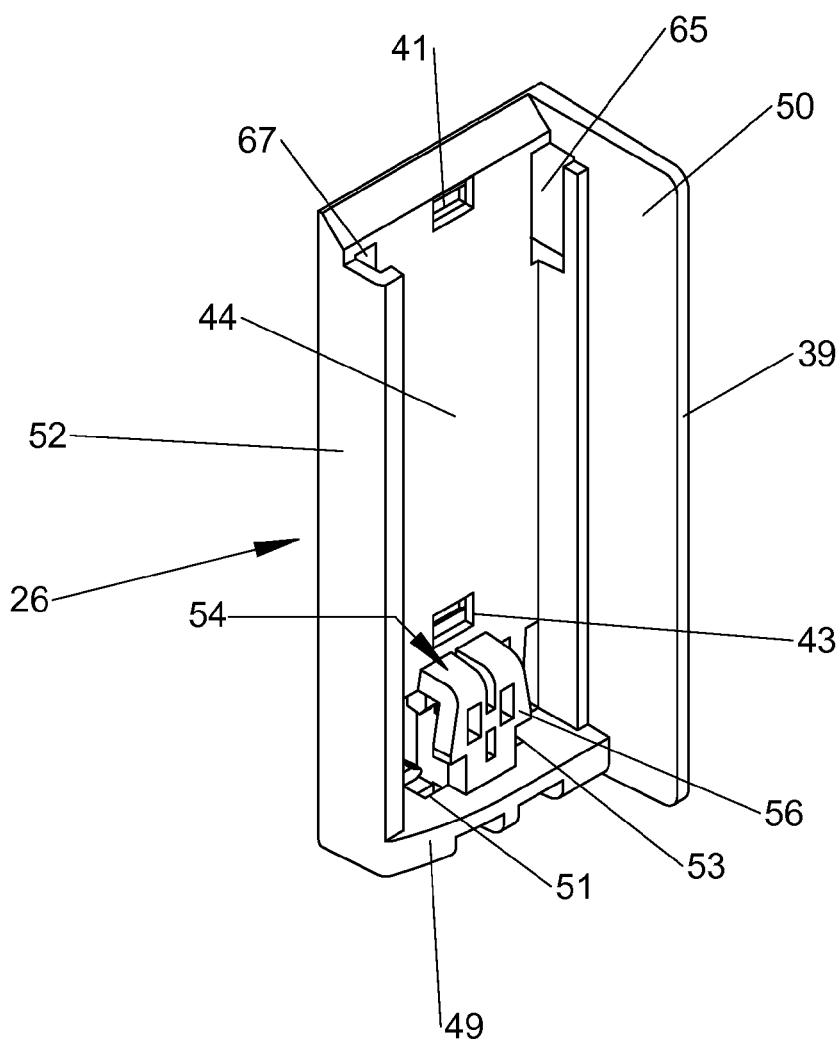
FIG. 5 is an isometric view of an upper attachment member positioned on the vertical supports 10 above the lower attachment member shown in FIG. 4.
Figure 6:
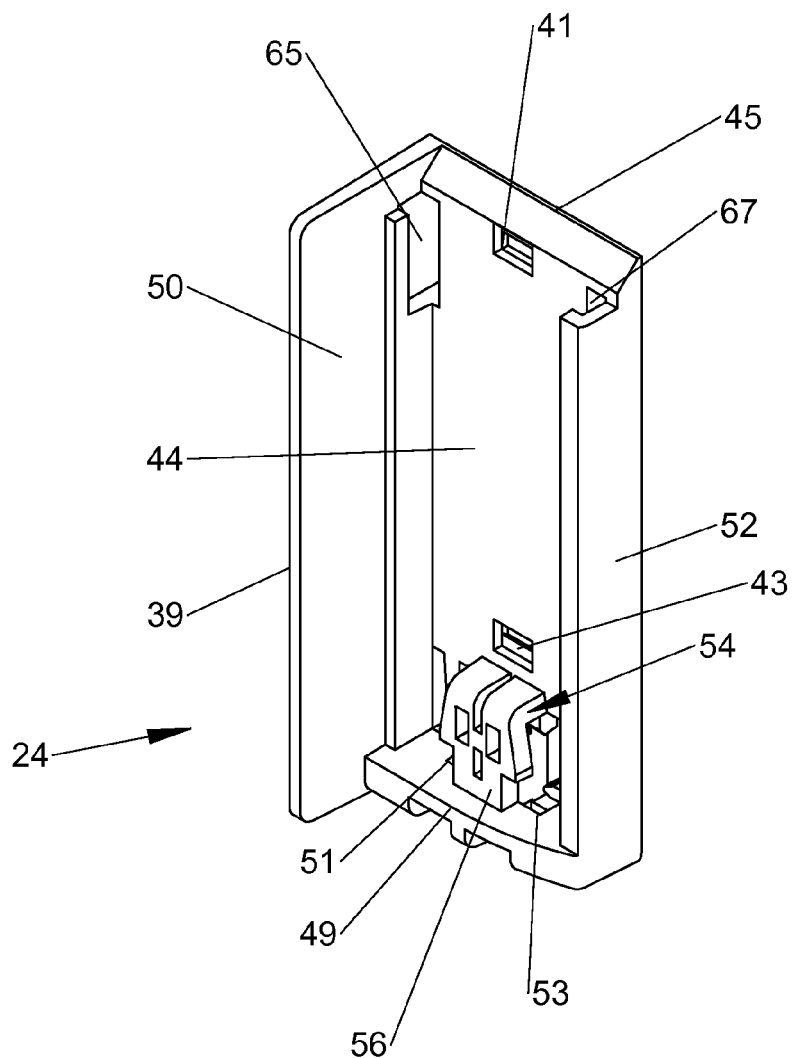
FIG. 6 is an isometric view of the upper attachment member for the opposing vertical support 12 retaining the opposite sides of the panel.
Figure 7:
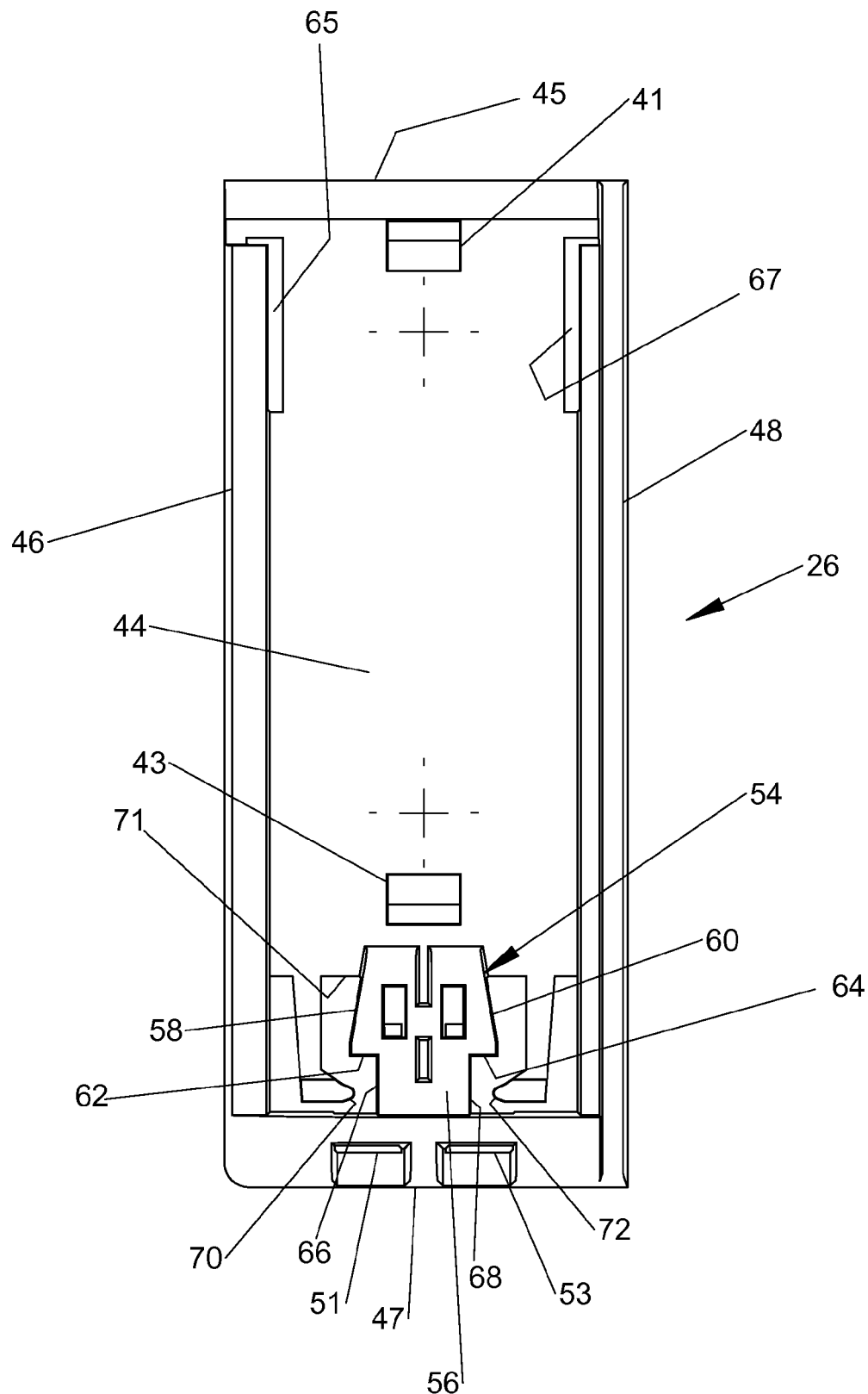
FIG. 7 is a front elevational view of the attachment member shown in FIG. 5.
Figure 8:
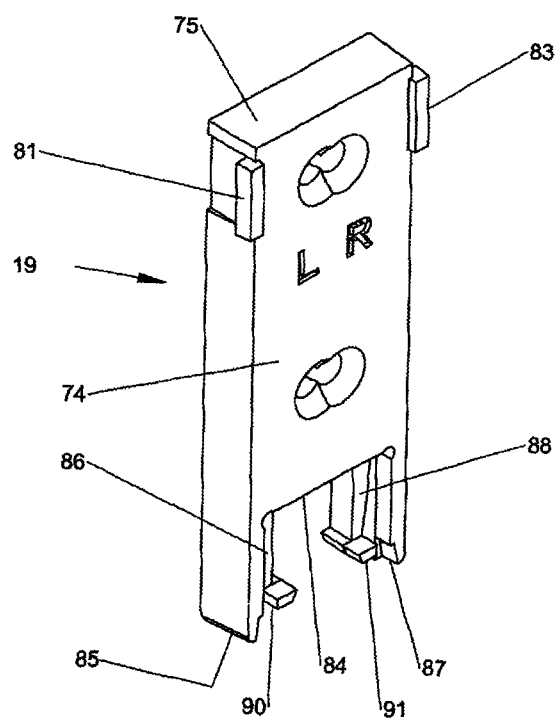
FIG. 8 is an isometric view of a panel attachment member adapted to engage the upper support attachment member shown in FIG. 5.
Figure 9:
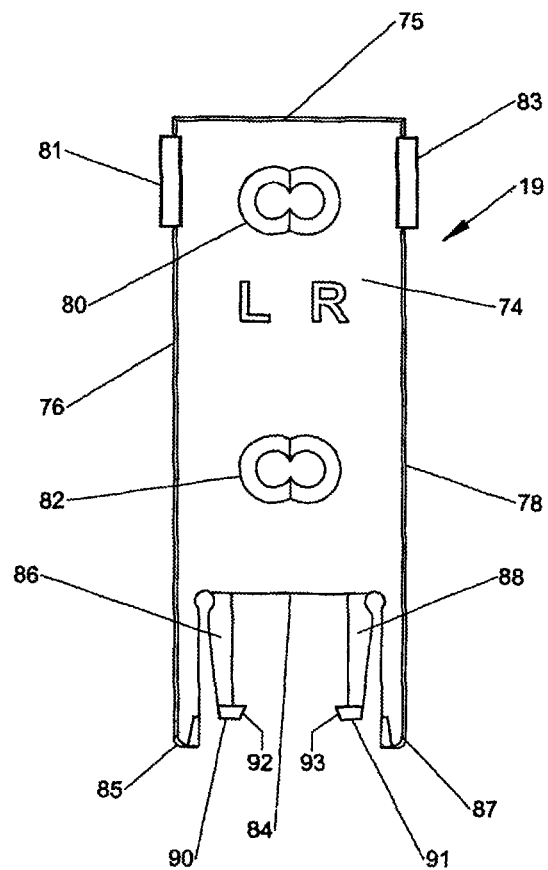
FIG. 9 is a front elevational view showing the panel attachment member shown in FIG. 8.
Figure 10:
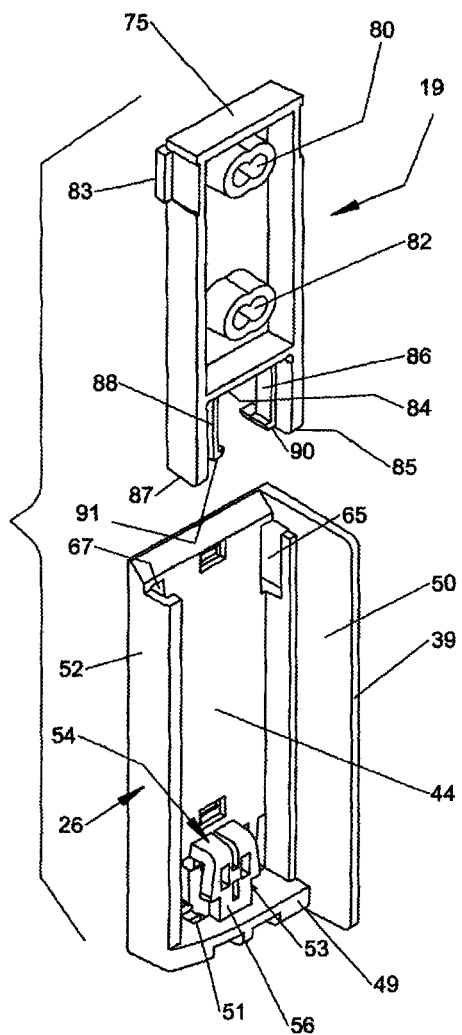
FIG. 10 is an isometric view of the upper attachment member shown in FIG. 5 positioned to receive the panel attachment member shown in FIG. 8 such that the relationship of the parts immediately prior to engagement is depicted.

Retainer 28 is a rigid member made of suitable material and includes a rectangular rearward plate 32 suitable for mounting against a surface of one of the vertical supports 10, 12 using any means known in the art, not shown. The plate 32 has parallel opposing sides 34, 36 and upper and lower ends 35, 37. Extending from each of the parallel sides 34, 36 are outwardly extending parallel flanges 40, 38, respectively. In the embodiment depicted, flange 40 has been broken into an upper portion and a lower portion; the upper portion extending to the upper end 35 and the lower portion extending to the lower end 37 of panel 32 with a spacing, unnumbered, between the portions, however; the flange 40 could be made as extending continuously from the lower end 37 to the upper end 35 of the reward plate 32. Flange 38 is positioned parallel to and spaced from flange 40, but extends only along the lower half of side 36 of rearward plate 32. The spacing between the inner surfaces of panels 38 and 40 is a little greater than the thickness of the sides 17, 18 of the panel 14. As shown in FIG. 4, the lower edge 16 of the panel 14 can be rested on the upper edges 42 of flanges 38 of the lower retainers 28, 30 as a first step towards assembling the panel 14 between two adjacent vertical support member 10, 12. When the upper end 15 of the panel 14 is elevated until the panel 14 is substantially vertical, the sides 17, 18 of the panel 14 will slide downwardly between the flanges 38, 40 of the lower retainers 28, 30. The flanges 38, 40 of the lower retainers 28, 30 will therefore retain the lower end 17 of the panel 14 between two adjacent vertical supports 10, 12.

Referring to FIGS. 1, 5, 6, and 7, the upper support attachment members 24, 26 are mounted on vertical supports 10, 12 respectively and again are mirror images of each other with the elements of member 24 being identical to those of member 26 but in mirror image so as to be mounted on the opposite sides 17, 18 respectively, of panel 14. Accordingly, only attachment member 26 is described herein.

Figure 13:
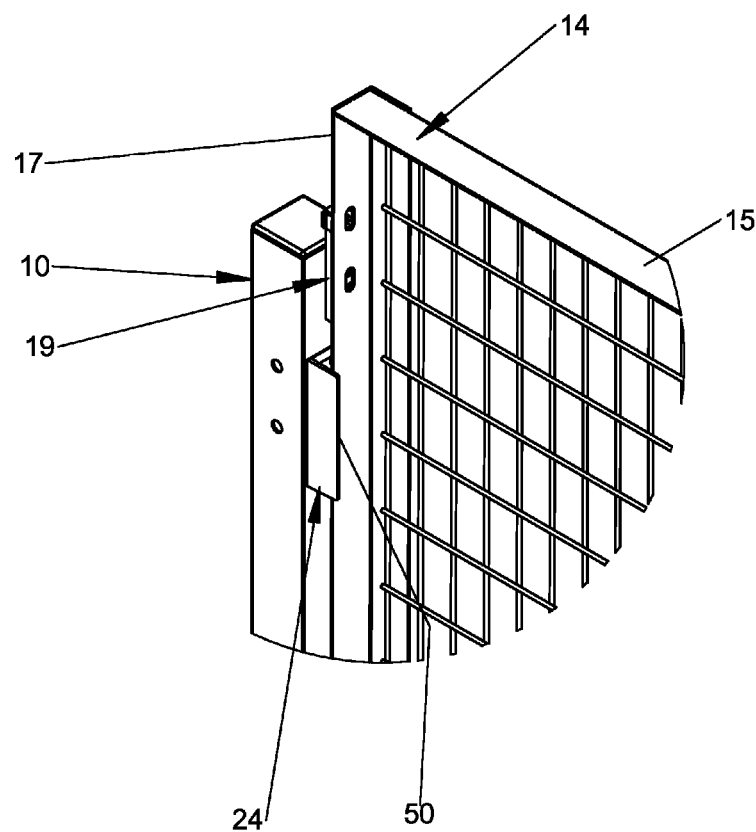
FIG. 13 is an isometric view taken from inside the protected area of the upper connector shown in FIG. 6 slideably receiving the panel connector of FIG. 8.

Upper attachment member 26 is also a rigid member made of a suitable material and includes a back plate 44 having parallel spaced apart sides 46, 48 and upper and lower edges 45, 47 respectively. The back plate 44 may also include mounting holes 41, 43 suitable for mounting the back plate 44 against one of the vertical supports 10, 12 using any means known in the art. Extending perpendicular to the back plate 44 from each of the parallel sides 46, 48 are parallel side panels that form walls 50, 52. The inner surfaces of the side walls 50, 52 form a track between which the surfaces of one of the panel attachment members 19, 20 is longitudinally slideable as is further described below. As shown, side wall 50 is wider than side wall 52 such that the outer edge 39 of side wall 50 is spaced further from the back panel 44 than does the outer edge of side wall 52. As shown in FIG. 13, side wall 50 of each of the upper attachment members 24, 26 is oriented to be above the flange 40 of the corresponding lower retainer 28, 30 and provide a back stop for contacting the sides 17, 18 of the panel 14 when it is positioned vertically between the supports 10, 12. Near the lower end of the upper attachment member 26 and extending outward of the back plate 44 is a projection 54 having a planar forward surface 56 and opposing irregular sides, that are perpendicular to the outer surface 56. The sides include opposing ramped portions 58, 60 below which are parallel shoulders 62, 64, the shoulders forming catches which are engaged by hooks in the panel attachment members 19, 20 as is also described below. Below the shoulders 62, 64 are parallel indented surfaces 66, 68 along which slide the prongs of the release tool, also discussed below. Near the upper edge 45 of plate 44 and indenting into the opposing side walls 50, 52 are vertically oriented elongate notches 65, 67 adapted to receive positioning tabs of the panel attachment member, as is also described below. Extending along the lower edge 47 is a forwardly projecting lower end wall 49 having a pair of spaced apart vertically oriented apertures 51, 53 extending vertically through wall 49 for receiving the prongs of a removal tool as is also described below.

Finally, positioned behind the projection 54 and forming an opening 71 in the back plate 44 that extends along opposite sides of the projection 54 and below the shoulders 66, 68 are opposing wedge-shaped compressible pins 70, 72. The pins 70, 72 are adapted to removably retain a removal tool inserted into apertures 51, 53 in the end wall 49.

Referring to FIGS. 1, 5 through 9, The upper support attachment members 24, 26 are adapted to receive one of the panel attachment members 19, 20. The panel attachment members 19, 20 are identical to each other and therefore only attachment member 19 is described herein. Panel attachment member 19 is also a rigid member having a generally rectangular body 74 with an upper end 75 and opposing parallel sides 76, 78 that are spaced apart a distance that is a little less than the width of the track formed by the inner surfaces of side walls 50, 52 of the upper support attachment members 24, 26. The rectangular body 74 also includes some mounting holes 80, 82 for retaining the panel attachment member 19, 20 to the outer end of one of the sides 17, 18 of the panel 14. The forward surface of the rectangular body 76, unnumbered, is planar such that the surfaces of rectangular body 74 readily slides within the track formed by side walls 50, 52 of the upper attachment members 24, 26.

Near the upper end 75 are a pair of elongate ears 81, 83 that extend along a portion of the sides 76, 78 and are adapted to fit into the elongate notches 65, 67 of the upper attachment members 24, 26 when the panel attachment members 19, 20 are fitted into their associate upper attachment members 24, 26.

At the lower end of the rectangular body 74 is a transverse surface 84, and extending downward from the transverse surface 84 are parallel spaced apart legs 85, 87. The outer surfaces of legs 85, 87 are extensions of the sides 76, 78 of the rectangular body 74, and the lower ends of legs 85, 87 are adapted to abut the end wall 49 of an upper attachment member 24, 26 when a panel 14 is assembled between two support members 10, 12.

Also extending downward from the transverse surface 84 and between legs 85, 87 are a pair of spaced apart arms 86, 88 at the lower end of which are inwardly directed projections 90, 91 that form hooks for engaging the shoulders 62, 64 of the upper support attachment members 24, 26. In the preferred embodiment, the arms 86, 88 are made with relatively small cross-sectional dimensions so that the arms 86, 88 have a degree of flexibility, allowing the projections 90, 91 to be expanded outward to thereby move along the ramped portions 58, 60 of the projection 54 as the rectangular body 74 moves downwardly in the track formed by side walls 50, 52 of the upper support attachment members 24, 26. The hooks formed by projections 90, 91 are adapted to engage the shoulders 62, 64 of the upper attachment members 24, 26 to retain the panel 14 in place between vertical support members 10, 12. The inwardly directed surfaces 92, 93 of the projections 90, 91 angle toward each other and upwardly as shown such that they can be wedged apart by a release tool as described below.

Figure 11:
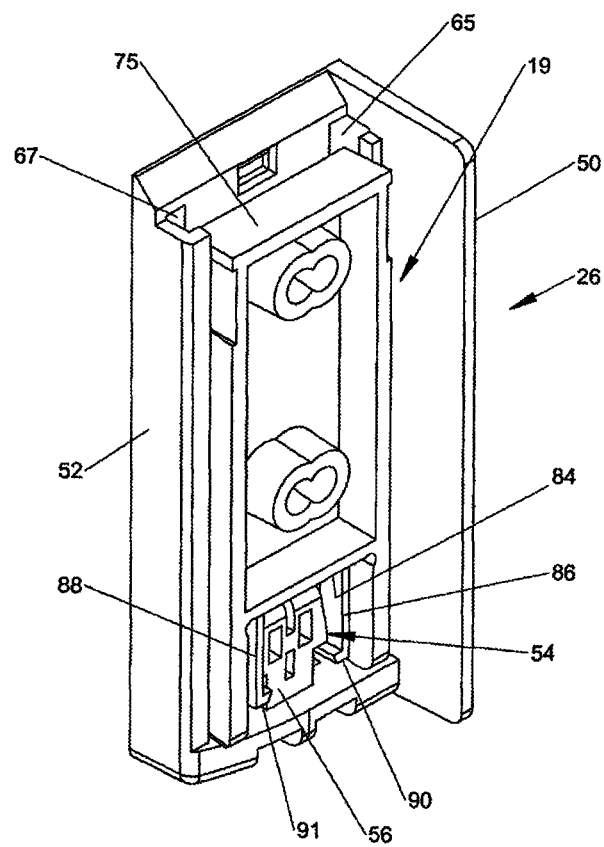
FIG. 11 is an isometric view of the panel attachment member of FIG. 8 connected to the upper attachment member of FIG. 5.
Figure 12:
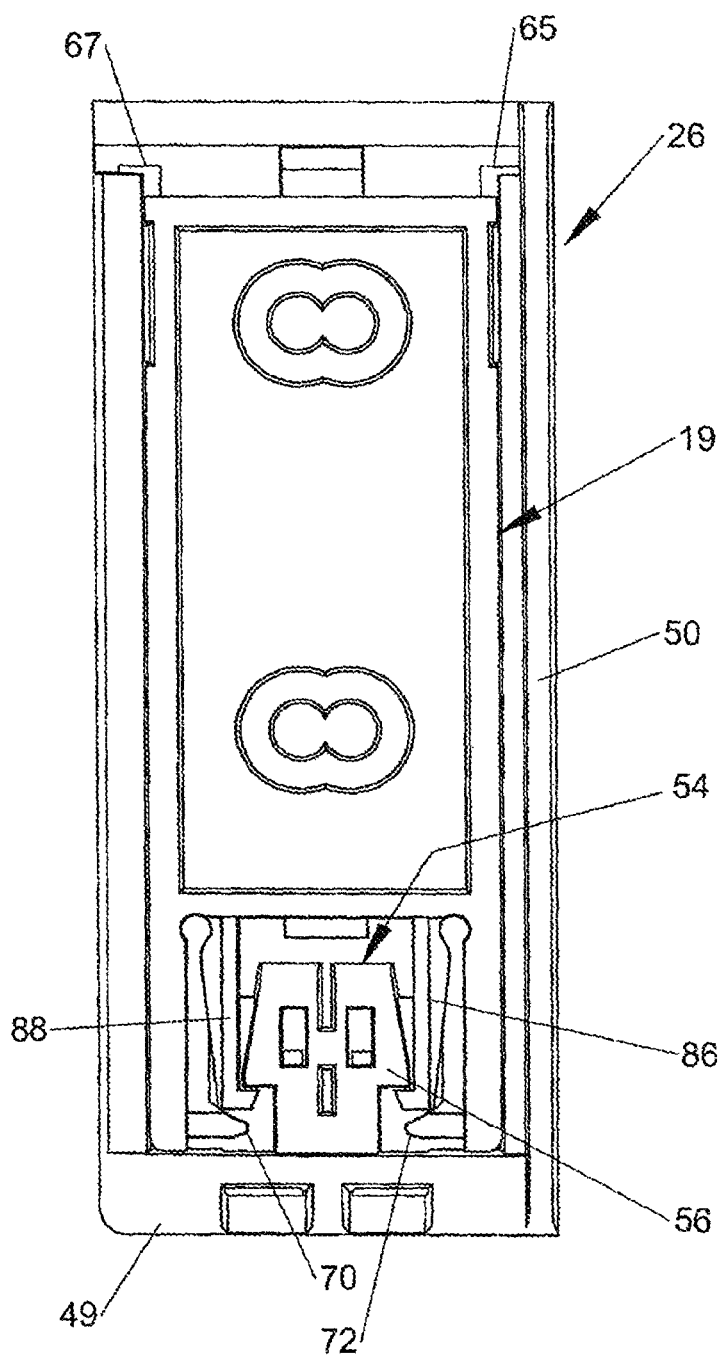
FIG. 12 is a front elevational view of the member shown in FIGS. 5 and 8 shown in connected relationship as depicted in FIG. 11.

As shown in FIGS. 1, 4, and 10 through 13, a panel 14 is assembled between adjacent support members 10, 12 by first placing the sides 17, 18 at the lower end 16 of the panel 14 on the upper surfaces 42 of flanges 38 positioned at the lower end of each of the vertical support members 10, 12. Thereafter, the upper end of the panel 14 is pivoted on surface 42 until the panel 14 is vertical and parallel to the vertical supports 10, 12 at which time the sides 17, 18 of the panel 14 will contact the side wall 50 of the two upper attachment members 24, 26, as shown in FIG. 13. Thereafter, the panel 14 is allowed to fall downwardly with the lower end 16 sliding between the flanges 38, 40 of the lower retainers 28, 30 and the rectangular body 74 of the panel attachment members 19, 20 fitting into the tracks 50, 52 of the upper support members 24, 26. The panel 14 is allowed to move downwardly within the tracks formed by side walls 50, 52 of the upper support members 24, 26 until the lower transverse surface 84 of the panel attachment members 24, 26 contact the upper surface of projection 54 of upper support attachment members 24, 26 and projections 90, 91 move across ramped portions 58, 60 and engage shoulders 62, 64. With the projections 90, 91 hooked over the shoulders 62, 64 the panel attachment members 19, 20 are locked to their associated upper support attachment members 24, 26 as shown in FIGS. 11 and 12.

Figure 14:
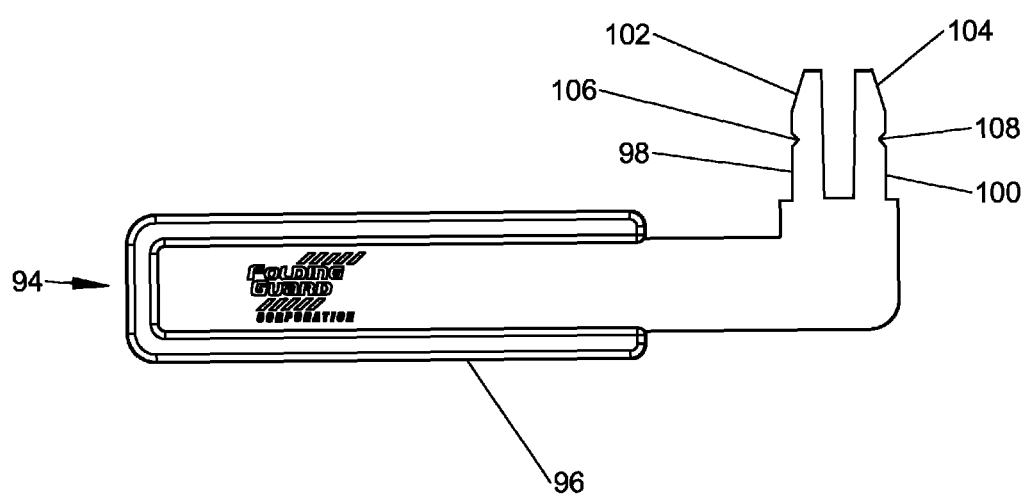
FIG. 14 is a front elevational view of a release tool for engaging the joined connectors shown in connecting relationship in FIGS. 11 and 12 and permitting removal of the panel from attachment between two vertical support members.
Figure 15:
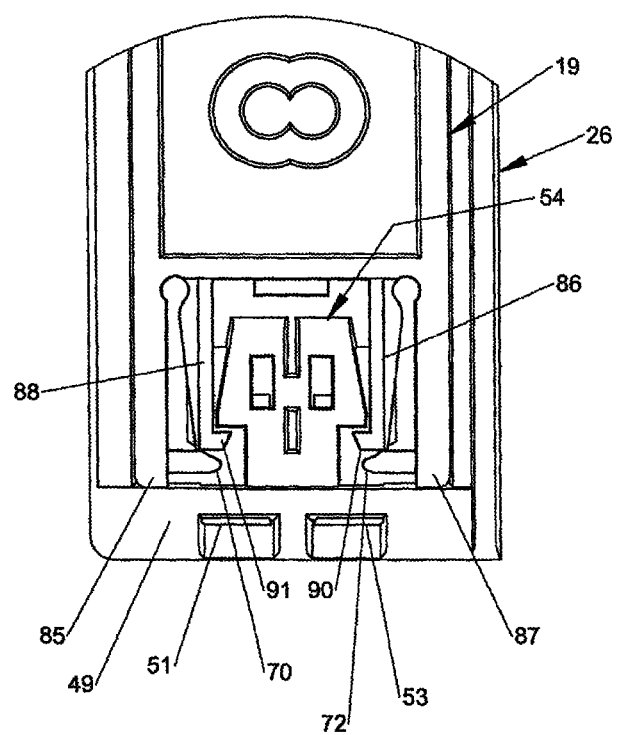
FIG. 15 is a fragmentary enlarged view of the connecting parts as shown in FIG. 12.
Figure 16:
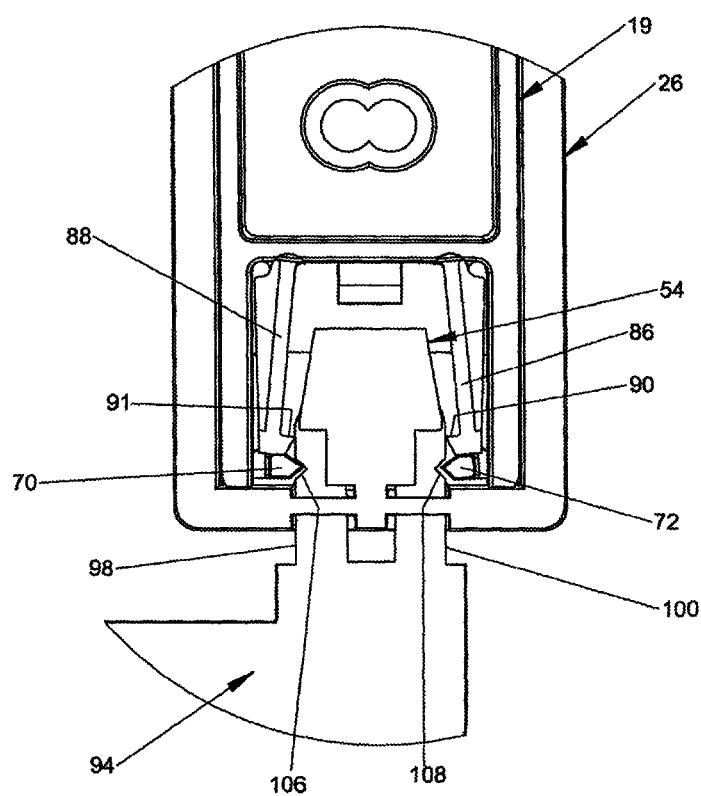
FIG. 16 is a front elevational view of the upper connector shown in FIG. 5 with the panel connector shown in FIG. 8 in connecting relationship and the release tool shown in FIG. 14 positioned to release the parts.

Referring to FIGS. 14, 15, and 16, to unlock the panel attachment members 19, 20 from their associated upper support attachment members 24, 26 a key 94 is provided. The key 94 includes a handle 96 at the end of which are parallel elongate release prongs 98, 100. The release prongs 98, 100 have parallel distal ends with outer surfaces 102, 104 that taper towards each other. Along the outer surfaces of the prongs 98, 100 are complementary notches 106, 108. The prongs 98, 100 of the key 94 are adapted to fit through apertures 51, 53 of an upper attachment member 24, 26 and slide along the inner surfaces 66, 68 of the projection 54 thereof. The outer ends of prongs 98, 100 will engage the angled outer ends 92, 93 of outer projections 90, 91 and thereby urge the arms 86, 88 away from each other. As the prongs 98, 100 of the key are moved further upwardly, the hook ends of projections 90, 91 are disengaged from the shoulders 62, 64 and the wedge shaped pins 70, 72 of the upper support attachment members 24, 26 will engage the notches 106, 108 of the key, thereby retaining the key 94 in place until the parts 19, 24 and 20, 26 have been separated. Once the parts have been separated, the key 94 can be pulled downwardly withdrawing the prongs 98, 100 from the wedge-shaped pins 70, 72.

Accordingly, there has been described a single embodiment in accordance with the present invention. However, there are many modifications and variations of the invention that may be had without departing from the spirit and scope of the invention. Therefore, it is the intent of the appended claims to cover all such modifications and variations which fall within the spirit and scope of the invention.

What is claimed:

1. A screening combination for separating an inner protected area from a more accessible area comprising:
   a panel having an inner surface, an outer surface, and opposing vertical sides;
   first and second spaced apart vertical supports, wherein each of said vertical supports comprises:
      an upper support attachment member having a vertical track with two spaced apart parallel vertical side walls, wherein a first side wall has a width that is greater than a width of a second side wall, such that the width of the first vertical side wall provides a backstop for contacting the opposing vertical sides of the panel; and
      a lower retainer for receiving a lower end of the panel;
   an upper panel attachment member and a lower panel attachment member on each of said opposing vertical sides of said panel, said upper panel attachment member attachable to said upper support attachment member on corresponding vertical exterior surfaces of each of the vertical supports and including a panel attachment surface for vertical engagement with said vertical track of said upper support attachment member, wherein said upper panel attachment member is vertically retained in a vertical orientation within said vertical track upon said vertical engagement, and wherein said lower panel attachment member is attachable to said lower retainer;
   a hook on said upper panel attachment member on opposing vertical sides of said panel;
   a catch on said upper support attachment member on said first and second vertical supports, wherein said catch is configured to receive said hook to retain said upper panel attachment member to said upper support attachment member, and wherein said catch is configured to engage said hook when the panel is in a vertical orientation.

2. The screening combination of claim 1 further comprising:
   a retainer on said one of said vertical supports,
   said retainer vertically spaced from said at least one attachment member, and
   said retainer having parallel flanges between which said panel is receivable.

3. The screening combination of claim 1 wherein
   said catch is a shoulder, and
   said hook is a projection extending perpendicular to the length of a partially flexible arm.

4. The screening combination of claim 1 and further comprising
   a compressible pin on said at least one attachment member for releasably retaining said release tool in a releasing engagement with said at least one attachment member.

5. The screening combination of claim 1 wherein
   said vertical track of said vertical support attachment members comprises two spaced apart parallel vertical side walls, and
   said panel attachment surface is slideably receivable between said side walls.

6. The screening combination of claim 1 wherein,
   said lower retainer has parallel flanges between which one of said opposing sides of said panel is receivable, and said one of said opposing side abutting said one of said side walls when said panel is vertically oriented.

7. A screening for separating an inner protected area from a more accessible area comprising:
 a panel having an upper edge, a lower edge, an inner surface, an outer surface, and opposing sides;
 first and second spaced apart vertical supports, each of said vertical supports comprising:
  an upper support attachment member for removeably retaining said panel between adjacent first and second vertical supports, said upper support attachment member comprising a vertical track configured to secure at least a portion of each of the corresponding upper panel attachment members in a longitudinally slideable position, wherein said vertical track comprises two spaced apart parallel vertical side walls, and wherein a first side wall has a width that is greater than a width of a second side wall, such that the width of the first vertical side wall provides a backstop for contacting the opposing vertical sides of the panel; and
  a lower retainer on a vertical exterior surface of the vertical supports for receiving the lower edge of the panel;
 an upper panel attachment member on each of said opposing sides attachable to said at least one upper support attachment member, said upper panel attachment members including a panel attachment surface for longitudinal engagement with said vertical track of said upper support attachment members, wherein said upper panel attachment member is longitudinally retained in a vertical orientation within said vertical track upon said longitudinal engagement;
 a hook on said upper panel attachment member on opposing vertical sides of said panel; and
 a catch on said upper support attachment member on said first and second vertical supports, wherein said catch is configured to receive said hook to retain said upper panel attachment member to said upper support attachment member, and wherein said catch is configured to engage said hook when the panel is in a vertical orientation.

8. The screening of claim 7, wherein each of said upper panel attachment members comprises a upper panel attachment surface complementary to said track wherein said upper panel attachment member is vertically moveable along said track;
 a hook on said upper panel attachment member; and
 a catch on upper support attachment member wherein said catch will receive said hook to retain said upper panel attachment member to said upper support attachment member.

9. The screening of claim 7 wherein said lower retainer has parallel flanges between which one of said opposing sides of said panel is receivable.

10. The screening of claim 8 wherein
 said track comprises spaced apart parallel vertical side walls, and
 said upper panel attachment surface is slideably receivable between said side walls.

11. The screening of claim 7 wherein
 said catch is a shoulder,
 said hook is a projection extending perpendicular to the length of a partially flexible arm.

12. The screening of claim 11, wherein said hook is configured to be released by a release tool.

13. The screening of claim 12 and further comprising,
 a compressible pin on at least one upper attachment member for releasably retaining said release tool in a releasing engagement with said at least one attachment member.

* * * * *